May 28, 1968  D. A. AVNER  3,385,590
VEHICLE SUSPENSION ASSEMBLIES
Filed Jan. 27, 1966  4 Sheets-Sheet 1
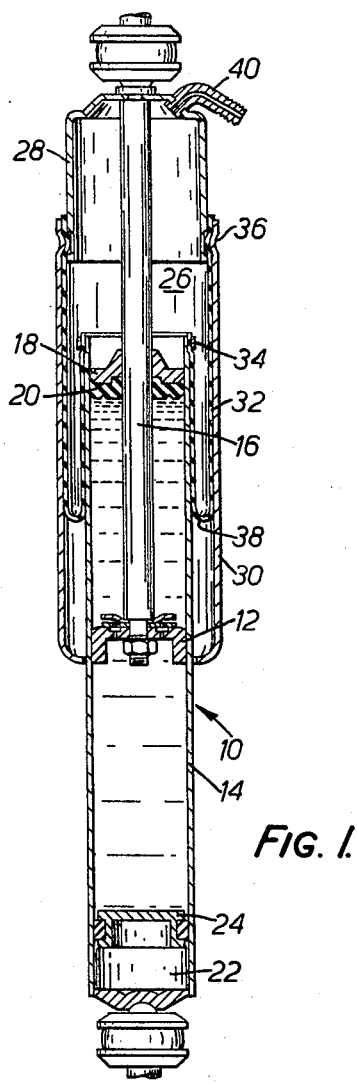
FIG. I.

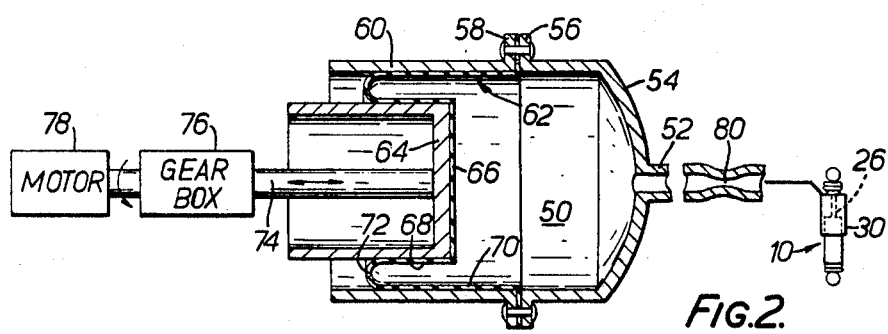
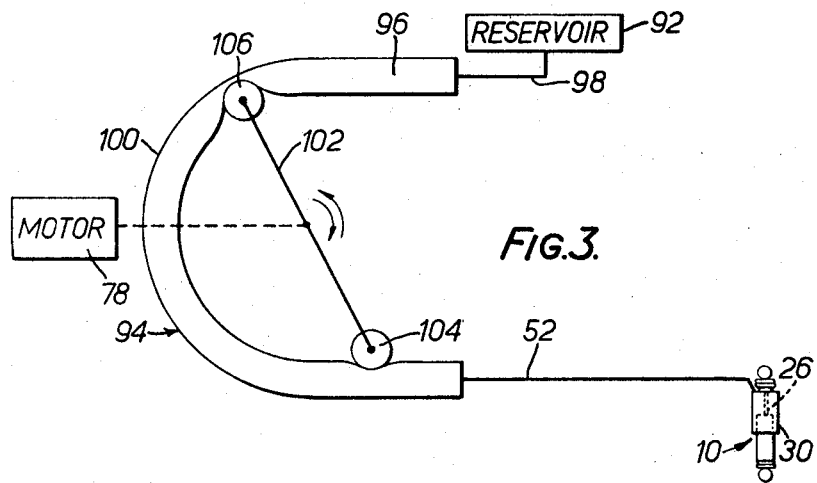

May 28, 1968  D. A. AVNER  3,385,590

VEHICLE SUSPENSION ASSEMBLIES

Filed Jan. 27, 1966  4 Sheets-Sheet 3

May 28, 1968  D. A. AVNER  3,385,590

VEHICLE SUSPENSION ASSEMBLIES

Filed Jan. 27, 1966  4 Sheets-Sheet 4

United States Patent Office 3,385,590
Patented May 28, 1968

3,385,590
VEHICLE SUSPENSION ASSEMBLIES
David Alan Avner, Birmingham, England, assignor to
Girling Limited
Filed Jan. 27, 1966, Ser. No. 523,361
Claims priority, application Great Britain, Feb. 5, 1965,
5,091/65
7 Claims. (Cl. 267—65)

ABSTRACT OF THE DISCLOSURE

A closed or sealed vehicle suspension system including a telescopic strut, a reservoir and pump means for controlling gas flow between the strut and reservoir to expand or contract the strut; selectively reversible means controllable by the vehicle operator for pumping gas from the strut to the reservoir or vice versa comprising in some embodiments a change-over valve and in another a reversible pump motor.

This invention relates to vehicle suspensions, and more particularly to a vehicle suspension assembly for supporting at least part of the sprung weight of a vehicle.

It is a disadvantage of simple suspension assemblies that the height and attitude of the sprung part of the vehicle can vary considerably with the loading of the vehicle, so that difficulties may be encountered with suspension geometry, spring stiffness with the ground clearance available and the inclination of the head lamp beam and rear mirror view.

Suspension assemblies have been proposed which comprise a telescopic strut for connection between sprung and unsprung vehicle parts, a reservoir connected to the strut, and a compressor for transferring air from the strut to the reservoir.

According to the present invention, there is provided a vehicle suspension assembly comprising at least one telescopic strut for connection between sprung and unsprung vehicle parts, a gas reservoir connected to the strut, and a pump selectively operable to displace gas in either direction between the reservoir and the strut.

With this arrangement it becomes possible to transfer gas quickly in both directions between the strut and the reservoir to give a fast response when an adjustment of height or attitude of the vehicle is required, and to use a higher rated but smaller pump unit than has been used in a prior proposal.

The strut and reservoir preferably form part of a sealed system to which atmospheric air is not normally admitted, thus avoiding the problems created by condensation and ingress of dirt in systems which draw in air during normal operation.

The invention also makes it possible to have the pressure in the strut higher than that in the reservoir, or vice versa, facilitating the use of a smaller reservoir than is the case where pumping is in one direction only. In a preferred embodiment of the invention, the direction of the flow of gas between the strut and the reservoir is controlled by a pair of oppositely directed one-way valves in combination with a changeover valve, thus permitting an extremely simple control means to be employed. The changeover valve can, for example be solenoid operated. The changeover valve is preferably arranged so that it is operable to allow the equalization of pressure between the strut and the reservoir with the pump stopped, the gas being directed by the changeover valve through the two one-way valves. This provides an extremely convenient and simple means of adjusting the pressure in the strut to the mean pressure of the system.

The control of the changeover valve may, for example, be effected by means of a dash-board mounted switch, or from automatic height sensing mechanism on the vehicle suspension.

Conveniently the reservoir capacity is equal or substantially equal to the strut capacity or to double the strut capacity if a pair of struts are used one on each of the rear corners of the vehicle, so that maximum and minimum strut pressures and thus automatic switching off of the pump can be obtained by a single pressure responsive switch responsive to the said maximum predetermined pressure and connected into a line to one of the one way valves, the reservoir being at the maximum predetermined pressure with such a capacity arrangement, when the strut is at the minimum predetermined pressure.

It is a particular advantage of this form of the present invention that the strut can be subjected to a predetermined minimum, predetermined maximum or a mean pressure under manual control from a dash-board switch, and can thus have its extension length in part controlled by the driver in accordance with the weight of the sprung part of the vehicle, or with the cargo weight if mechanical springs are provided to take the kerb sprung vehicle weight.

The pump and control valves may be positioned inside the reservoir to provide a compact unit easily mounted on the vehicle.

In an alternative embodiment, the pump, which is reversible, is connected in series between the strut and the reservoir and is constructed to act as a valve to prevent direct communication between the strut and the reservoir, no other valving being required for this purpose. This arrangement has the obvious advantage of cutting down the number of working parts and simplifying construction and assembly.

In another embodiment, the pump has a working chamber which also constitutes the chamber of the reservoir, the chamber having a movable end wall which can be driven in either direction by reversible motor means to vary the volume of the chamber and thereby control the displacement of gas between the chamber and the strut. This arrangement again has the advantage of a reduced number of working parts, and is capable of very fast response.

In a typical installation the predetermined maximum strut pressure is arranged to be 74 lbs. p.s.i. and the predetermined minimum strut pressure is arranged to be 10 lbs. p.s.i. The entire system therefore is always under pressure.

By the phrases "static height," "static pressure," and "static position" used in this specification are meant the equilibrium values of these parameters obtaining in operation with the vehicle at rest.

Other features and advantages of the invention will appear from the following description of some embodiments thereof, given by way of example in conjunction with the accompanying drawings in which:

FIGURE 1 is a sectional view of a unit used in the suspension assemblies of the embodiments.

FIGURE 2 is a schematic diagram of a first pneumatic suspension assembly.

FIGURE 3 is a schematic diagram of a second pneumatic suspension assembly.

Figure 4A:
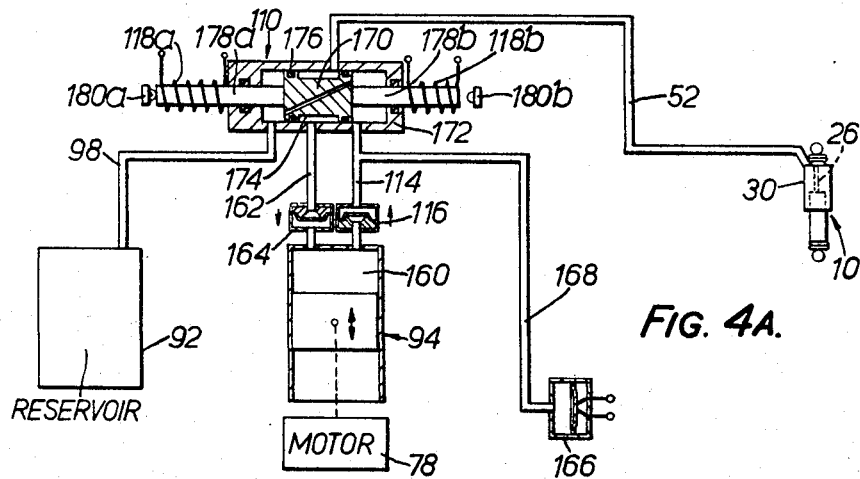
FIGURES 4A and 4B are schematic diagrams of a third preferred embodiment of the invention in different operational conditions.

Referring to FIGURE 1 each of the assemblies of the embodiments includes a combined gas spring and hydraulic damper unit for connection between sprung and unsprung parts of a vehicle at the rear axle of the vehicle, a pair of assemblies of the various kinds to be described being provided in the vehicle one for each end of the rear axle, to control the attitude of the vehicle.

The combined unit has a hydraulic damper 10 comprising a valved piston 12, sliding in a cylinder 14. In use, the cylinder 14 is attached to a rear wheel mounting, while a piston rod 16 secured to the piston 12 is attached at its free end to the chassis or frame of the vehicle. The piston rod 16 extends through an end cap 18 for the cylinder 14 which also forms a guide for the piston rod. A fluid seal 20 is provided on the end cap 18 to prevent escape of damper fluid from the cylinder 14 past the piston rod 16. To accommodate displacement of the damper fluid by the motion of the piston rod 16 into and out of the cyclinder 14, a gas space 22 is provided at the end of the cylinder remote from the end cap 18, the gas in the space 22 being separated from the hydraulic fluid in the remainder of the cylinder 14 by a free piston 24.

A gas chamber 26 is provided round the free portion of the piston rod 16. One end of the chamber 26 is closed by a cup 28 welded to the free end of the piston rod 16. A cylindrical tube 30 is secured to the periphery of the cup 28 and extends over and surrounds the free portion of the piston rod 16 and part of the cylinder 14. A flexible and inextensile tubular diaphragm 32 connects the cylinder 14 to the cup 28, being sealed round the end of the cylinder 14 by a band 34 and to the periphery of the cup 28 by being trapped between a corrugation 36 and a pair of substantially sharp edged shoulders formed at the edges of a circumferential recess opposite the corrugation. The diaphragm 32 forms a rolling seal for the chamber 26 between the cylinder 14 and cup 28, a U-bend 38 in the diaphragm rolling between the outer and inner walls respectively of the cylinder 14 and tube 30. In addition to providing a support for the diaphragm 32, the tube 30 acts as a dust and stone guard for the part of the cylinder 14 on which the U-bend 38 rolls. A pipe connector 40 mounted on the cup 28 forms a port for the passage of air into and out of the chamber 26. In use gas in the chamber 26 is maintained at a pressure of, for instance, about 60 pounds per square inch, so as to provide a spring force acting effectively in parallel with the damper 10.

Referring now to FIGURE 2, the chamber 26 of the combined damper and spring unit described above is filled with air and communicates with a pump and air reservoir chamber 50, through a conduit 52 connected to the pipe connector 40. The conduit 52 enters a bell-shaped member 54, forming one wall of the chamber 50, which is riveted by peripheral flanges 56 and 58 to a cylindrical skirt 60. The other wall of the chamber 50 is formed by a flexible and inextensible diaphragm 62 which forms a rolling seal between a skirted piston 64 and the skirt 60. The end face of the piston 64 carries a flat part 66 of the diaphragm 62, the remainder of the diaphragm forming two tubular walls 68 and 70 connected by a U-bend 72 and pressed respectively against the skirt 74 of the piston 64 and the skirt 60, thus defining between them an annular extension of the chamber 50.

The piston 64 is slidable axially of the skirt 60 by means of a piston rod 74 to vary the volume of the reservoir chamber 50. By this action air can be pumped through the conduit 52 to vary the pressure in the spring chamber 26, the stroke of the pump piston 64 being sufficiently large to provide the required range of pressure variation. The piston rod 74 is driven through reduction gearing 76 by an electric motor 78; the drive should be reversible and self-locking, and in a suitable form a reversible electric motor 78 works through a double set of worm screws and wheels on a rack and pinion device. The motor 78 may be controlled manually by a three position switch on the dash-board of the vehicle, for instance by watching the changing position of the headlamp beam as the attitude of the vehicle alters on energisation of pump motor 78. Alternatively the attitude of the vehicle may be corrected automatically by a swiching device sensitive to variation of the sprung mass of the vehicle from a desired attitude. The switching device may be a cam arrangement rotatable by a trailing link connected between the vehicle body and the cylinder 14 to close one of a pair of microswitches and actuate the motor 78 in an appropriate sense when predetermined limits to the extension of the suspension are exceeded. The switching device will also include a delay device such as a thermal relay to prevent hunting of the motor 78 which would result from the rapid movement of the suspension when the vehicle is moving.

In view of the rolling diaphragm 32 at the spring chamber 26, it is necessary to ensure that the static pressure in the spring chamber is such that even with the chamber fully expanded at the bottom of the rebound stroke of the suspension, the pressure in the chamber does not drop below atmospheric pressure, lest the re-entrant parts of the diaphragm by the U-bend 38 collapse and come in contact with each other, which would make the diaphragm liable to mechanical damage. Also, in order to separate the chamber 26 and reservoir 60 for transient pressure variations, so as to bound the effective springing volume, a constriction 80 is provided in the conduit 52. A manual override control may be provided to vary the level at which the vehicle is maintained, for instance to provide harder suspension for traversing rough ground.

It will be seen that the chambers 26 and 50 and the conduit 52 of the assembly as so far described form a completely sealed enclosure. However seepage of air from the sealed joints of the system will occur slowly, and provision is made for occasionally topping up the air pressure, for instance from the air line at a garage forecourt.

For this purpose, a valve (not shown) generally similar to the valve of a pneumatic tyre is provided connected to the spring chamber 26. This valve may also be arranged to admit air direct from the atmosphere to the chamber 26 in the event that the pressure therein drops below atmospheric pressure for instance during motion of the vehicle under extreme rebound of the suspension. However it will be appreciated that the sealing of the enclosure mentioned above is maintained during normal operation of the system, and in particular that the enclosure does not communicate with the atmosphere in normal alteration of the static pressure in spring chamber 26 by actuation of pump motor 78.

By virtue of the closed nature of the system the problems associated with condensation effects and dust and dirt 70 do not arise, in contrast to open systems in which the spring air pressure is varied by pumping in, or letting out, air direct from the atmosphere.

In the assembly shown in FIGURE 3, the functions of the pump and reservoir chamber 50 of the first embodiment are divided. Referring to FIGURE 3, a reservoir chamber 92 is provided, communicating with the spring chamber 26 by a pump unit 94 for extracting air from the reservoir and passing it to the spring chamber, and the converse.

The pump unit 94 is of the roller and tube kind, and comprises a tube 96 of flexible and inextensile material connected at one end by a conduit 98 to the reservoir chamber 92, and at the other end to the conduit 52. The tube 96 is arcuately curved to a U-shape with a semi-circular portion 100. An arm 102 bearing at its ends rollers 104, 106 is pivoted at the centre of the semi-circle, the rollers engaging the tube 96 so as to press flat locally the walls of the tube. The arm 102 is driven by the pump motor 78 to run the rollers along the semi-circular part 100, squeezing a charge of air along the tube 96 in the direction of rotation. With the motor 78 stopped, the pressure of the walls of the tube 96 against each other at the position of one of the rollers 104, 106 seals the spring chamber 26 from the reservoir chamber 92, so that the pump can act as a valve to prevent the flow of air between the reservoir and the strut.

The air in the reservoir chamber 92 is pressurised, thus increasing the pump efficiency, and in this embodiment the motor 78 may be as small as, for instance a windscreen wiper motor. However, if the reservoir were maintained near atmospheric pressure, the loading on this component would be reduced, although of course a physically larger chamber would be required to accommodate the same mass of gas.

As an alternative, the reservoir chamber 92 may be omitted, the conduit 98 being open to the atmosphere through suitable air filtering arrangements.

Figure 4B:
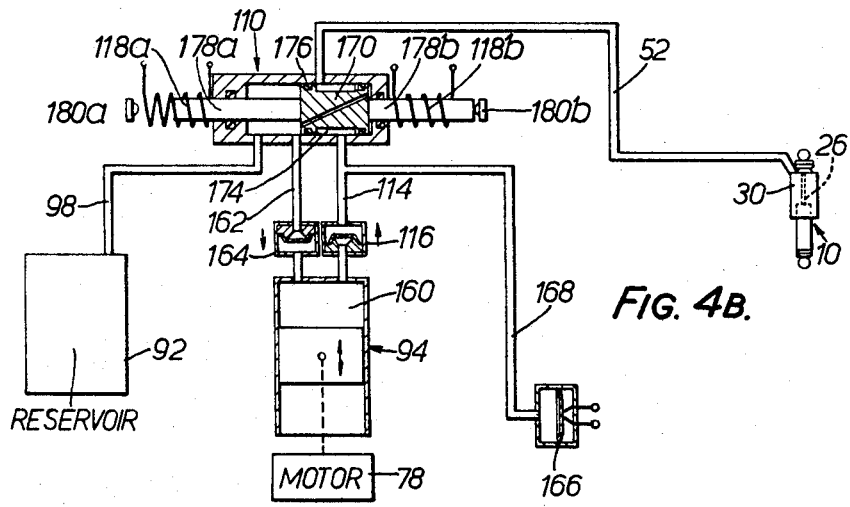

In the assembly shown in FIGURES 4A and 4B, a gas reservoir 92 is connectable to the conduit 52 through a conduit 98, a changeover valve 110, and a pump unit 94. The pump unit 94 is a cylinder swept by a piston, the piston being reciprocated by an electric motor 78. The pump chamber 160 is connected to the changeover valve 110 by conduits 114 and 162 respectively having non-return valves 116 and 164, and the valves 116 and 164 are arranged respectively to permit flow from the pump chamber 160 to the valve 110 and from the valve 110 to the pump chamber. A pressure switch 166 connected by a conduit 168 to the conduit 114 is responsive to the back pressure in the conduit 114 tending to close the valve 116.

The changeover valve 110 comprises a shuttle 170 sliding in a closed cylinder 172. The shuttle 170 is generally cylindrical and has a peripheral annular groove 174 formed in its curved surface, sealing rings being provided on either side of the groove 174, sealing the shuttle to the inner surface of the cylinder 172. A passage passes through the shuttle between its end faces. Solenoid windings 118a and 118b co-operate with rods 178a and 178b secured to the shuttle 170 to control the position of the shuttle in the cylinder 172. Microswitches 180a and 180b are acted on by the rods 178a and 178b to control the energisation of the windings 118a and 118b. The energisation of the windings 118a and 118b and of the motor 78 is controlled by a control switch (not shown in FIGURES 4A and 4B) having upper, mid and lower positions.

Figure 5:
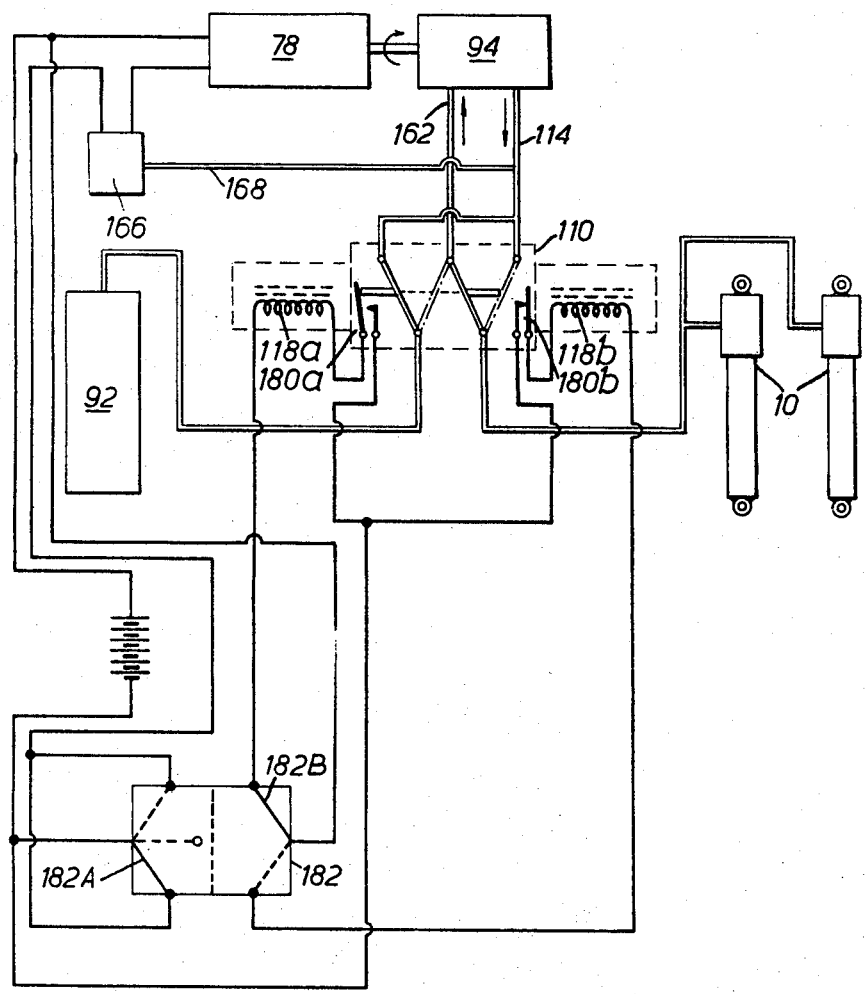
FIGURE 5 is a schematic diagram of another preferred embodiment of the invention.

The control switch, shown diagrammatically at 182 in FIGURE 5, conveniently takes the form of a 3-way toggle switch connected to two moving contacts 182A and 182B. The contact 182A has three operative positions, two extreme positions in which it energises the motor 78, and a neutral mid-position in which the motor is de-energised. The other moving contact 182B is spring loaded so that it has only two operative positions and no neutral midpsition. In one operative position it energises solenoid 118A, and in the other it energises solenoid 118B. The operative connections are such that when the switch handle is moved from one extreme position to its mid-position, the contact 182B will change over; if the switch handle is then moved on to the other extreme position, the contact 182B will remain in its new position, but if the handle is moved back to its first position the contact 182B will also move back to its initial position.

With the control switch moved from its upper to its mid-position, the shuttle is in the position shown in FIGURE 4A, and excess pressure in the spring chamber 26 over the pressure in the reservoir 92 will pass air through the conduit 52, around the shuttle 170 in the annular groove 174, through the conduit 162, the valve 164, and the pump chamber 160, the pump being idle at this stage, through the conduit 114, the valve 116, the passage 176, and the conduit 98 to the reservoir 92. This free passage of gas continues until, in use in one construction, the pressures in both the reservoir and spring chamber become the same at a static pressure of 44 lbs. p.s.i. above atmospheric pressure.

If the control switch is now moved to its lower position, the shuttle remains in the same position, and the motor 78 is energised to remove air from the spring chamber 26 and pump it into the reservoir 92. The pressure switch 166 is connected now to the reservoir, and operates to stop the pump when the pressure in the reservoir 92 has risen to 74 lbs. p.s.i. above atmospheric pressure, at which time the static pressure in the spring chamber 26 will have fallen to 10 lbs. p.s.i. above atmospheric.

Movement of the control switch now to its mid-position from its lower position will energise the winding 118b to move the shuttle 170 to the position shown in FIGURE 4B, the current to the winding being cut off by the microswitch 180b when this position is reached. Air now flows from the reservoir 92 through the conduits 98 and 162, the valve 164, and the pump chamber 160, the pump being idle, through the conduit 114, the valve 116, the groove 174 and the conduit 52 to the spring chamber 26 to equalise the pressures in the spring chamber and the reservoir, as before.

Movement of the control switch to its upper position now energises the pump 94, leaving the shuttle 170 in the same position, and the pump removes air from the reservoir 92 and passes it into the spring chamber 26. The pressure switch 166 is now measuring the pressure in the spring chamber 26 and when this pressure reaches 74 lbs. p.s.i. above atmospheric, the pressure switch cuts off current to the motor 78. The reservoir 92 is then at a pressure of 10 lbs. p.s.i. above atmospheric. A feature of the pressure switch 166 is that even if the pressure in the chamber 26 is now reduced, for instance by reducing the load in the vehicle, the pressure switch will not be re-actuated to permit energisation of the motor 78 until the pressure in the chamber 26 drops to below 60 lbs. p.s.i. above atmospheric.

The consequences of the above cycle of operations are as follows: with a full load in the vehicle the control switch is kept in its upper position. If part of the load is now removed, the back of the vehicle will rise, and to compensate in part for this rise, the control switch is moved to its mid-position, reducing the pressure in the chamber 26, and the back of the vehicle sinks to near the normal height. If the whole load is removed the back of the vehicle again rises, the control switch is moved to its lower position, and the back of the vehicle sinks back again to near its normal position.

It will be appreciated that the above embodiments are described solely as illustrations of ways in which the invention may be performed, and that elements and features of one embodiment may often be used in another of the embodiments.

It will also be appreciated that while the particular combined damper and spring unit described is preferred, the air spring unit may be provided in other ways. For instance, instead of combining the spring chamber with a single-tube damper as described, other telescopic dampers can be conveniently combined with the spring chamber.

In use two assemblies of one of the kinds described are provided one at each side of the rear axle of the vehicle, in substitution for the normal telescopic damper units, the air springs acting in assistance to the main mechanical springing of the vehicle, permitting softer mechanical springs to be used and giving improved suspension performance over the range of vehicle loads.

Similar assemblies may also be provided in the front suspension of the vehicle. The assemblies described may be incorporated in the vehicle with little or no modification of the vehicle structure but suitable air spring assemblies may be used as the sole springing in the vehicle, if the vehicle is so designed.

Instead of using completely separate assemblies for each wheel of the vehicle, the assemblies can be interconnected. For instance, the spring chambers 26 may each be connected to a common pump by constricted conduits which will reduce the tendency, otherwise introduced, for the vehicle to roll. If a separate reservoir is used this may be connected in common to each of the chambers 26 through separate pump units which isolate the spring chambers 26. Such interconnection of the components assemblies will save the necessity for multiplication of bulky, and comparatively expensive components.

It will also be appreciated that the control means illustrated in FIGURE 5 are illustrative only, and that many modifications will be possible. In all of the embodiments, the suspension assembly may be under manual control, or automatic control, by means for example of limit switches arranged to sense the relative positions of the sprung and unsprung parts of the vehicle. The reversible pump shown in FIGURE 3 can be used with particular advantage in an automatically controlled arrangement, because of its ability to act as a valve between the strut and the reservoir even when stopped. Again, in the embodiment of FIGURES 4A and 4B, a reversible compressor and motor could be used, the reversal of the motor being arranged to actuate the changeover valve 110. The changeover valve need not be operated by electro-magnetic means, as described, but could alternatively be operated by suitable mechanical, electrical, pneumatic or hydraulic means, automatically or manually. It would also be possible to arrange for the pressure responsive switch to be made responsive to the difference in pressure between the strut and the reservoir to stop the pump when a predetermined differential pressure is attained.

What I claim is:

1. A vehicle suspension assembly comprising at least one telescopic strut for connection between sprung and unsprung vehicle parts, a gas reservoir connected to the strut, a pump to displace gas in either direction between the reservoir and the strut, a pair of oppositely directed one-way valves and a changeover valve co-operating therewith to control the direction of gas flow between said strut and said reservoir.

2. An assembly in accordance with claim 1, wherein said changeover valve is operable, with said pump stopped, to permit equalization of pressure between said strut and said reservoir, the gas being directed by said changeover valve through said one-way valves.

3. An assembly in accordance with claim 1, further comprising pressure responsive switch means arranged to stop the pump in response to a predetermined pressure being attained in the said reservoir or said strut.

4. A vehicle suspension assembly comprising at least one telescopic strut for connection between sprung and unsprung vehicle parts, a gas reservoir connected to the strut, and a pump for displacing gas in either direction between the reservoir and the strut, said reservoir and strut forming part of a sealed system to which atmospheric air is not normally admitted, and wherein said pump is reversible, is connected in series between said strut and said reservoir, and is constructed to act as a valve to prevent direct communication between said strut and said reservoir, no other valving being required for this purpose.

5. An assembly in accordance with claim 4 wherein said pump comprises a flexible tubular body whose opposite ends are connected to said strut and said reservoir, respectively, and a plurality of spaced members movable in either direction along the length of said body in engagement therewith so as to flatten said body locally and thus close the bore of said body.

6. An assembly in accordance with claim 5, wherein said body is curved to arcuate form over at least part of its length, and comprising a rotatable assembly having an axis of rotation at the centre of curvature of said body, a plurality of rollers mounted on said assembly and constituting said spaced members, and reversible rotary drive means operatively coupled to said rotary assembly.

7. In a vehicle suspension system comprising at least one telescopic strut for connection between sprung and unsprung vehicle parts, and a pump operatively connected to said strut for supplying gas under pressure thereto, that improvement which comprises reversible selector means selectively operable to reverse the direction of gas flow between said reservoir and said strut, whereby gas pressure in said strut may be higher than that in said reservoir, or vice-versa.

References Cited

UNITED STATES PATENTS 2,895,745   7/1959   Brueder.

ARTHUR L. LA POINT, *Primary Examiner.*

R. M. WOHLFARTH, *Assistant Examiner.*